July 17, 1928.
G. B. LINDERMAN, JR
1,677,835
METER
Filed March 4, 1926
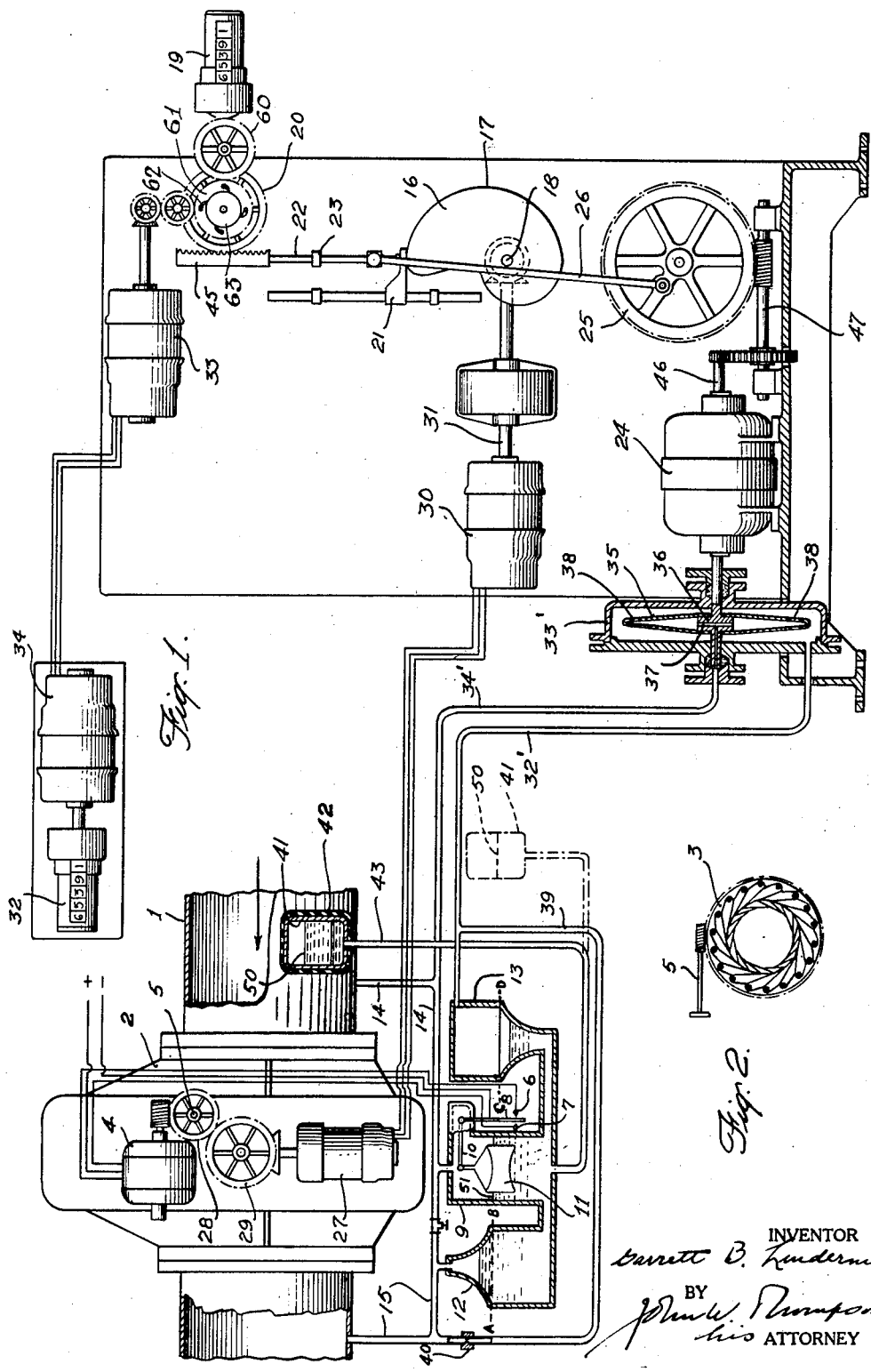

Patented July 17, 1928.

1,677,835

UNITED STATES PATENT OFFICE.

GARRETT B. LINDERMAN, JR., OF ERIE, PENNSYLVANIA, ASSIGNOR TO AMERICAN METER COMPANY, INCORPORATED, OF NEW YORK, N. Y., A CORPORATION OF DELAWARE.

METER.

Application filed March 4, 1926. Serial No. 92,138.

My invention relates more particularly to flow meters for measuring and indicating the volume of gases or other fluids in terms of predetermined units, referred to standard conditions such, for example, in the case of gas, as the physical characteristics of density, temperature, absolute pressure, and moisture content. One object of my invention is to provide a gas meter of the orifice type which will be in some respects an improvement on the form of apparatus described and claimed in my pending application, Serial No. 657,344 filed August 14, 1923. In said apparatus the effects of changes in these characteristics or any of them are counterbalanced and thus do not affect the readings of the meter in the said predetermined units. The area of the valve orifice therein varies with variation in differential pressure across the orifice only in response to changes in gas demand, such change in orifice area operating substantially to maintain the differential pressure at a predetermined value. Such a meter includes broadly motor means for varying the area of the valve orifice means responsive to a change in differential pressure across the orifice due to change in demand for controlling the operation of the motor so as to change the area of the orifice in order to maintain or restore the predetermined pressure differential across the orifice and in addition thereto means for preventing changes in orifice area which would otherwise result from variations in density, temperature, absolute pressure and moisture content of the gas flowing.

In measuring certain fluids, such as coke oven gas, it is desirable that the measure of volume of gas flowing shall be expressed in units referred to standard conditions. The unit generally adopted is a cubic foot of gas at a pressure of 30" of mercury, at a temperature of 60°F. and saturated with moisture. Various well known orifice meters in use at the present time have an orifice of fixed area and utilize the differential pressure or drop in pressure across the orifice as a basis of measurement of the volume flowing. However, to correct these readings for varying conditions of density, temperature, absolute pressure, and moisture content, absolute pressure representing the result of both the barometric pressure and the pressure in the pipe line, involves several com-
plex calculations, if charts have not been previously compiled. Such meters are also objectionable for the reason that an orifice having a suitable area for normal demand does not give accurate results when the demand is either abnormally large or abnormally small. With excessive demand, the pressure difference increases at a rate greater than the increase in quantity of gas flowing and for small demands the reverse may be true whereupon the pressure difference becomes too small to produce accurate results.

My prior application aforesaid discloses a gas meter having a valve or variable orifice means in which the area of the orifice is used as a factor in determining the quantity of gas flowing. When a change in demand for gas occurs, the first effect is a temporary disturbance of the pressure difference across the orifice resulting in the operation of an appropriate motor to change the orifice area until said pressure difference is restored to its original or predetermined value. Moreover, means are shown for preventing changes in the standard conditions of density, absolute pressure, temperature and moisture content of the gas from affecting the area of the orifice. Hence, with said apparatus, the area of the orifice may accurately be made a function of the quantity of gas flowing referred to said standard conditions.

My present invention also relates to apparatus for securing the results hereinabove stated and involves substantially similar principles of operation. However, in my improved meter construction hereinafter to be described, I have incorporated simpler and more practicable valve controlling means and means for offsetting the effect of or preventing those changes in valve orifice area which would otherwise result from certain variations in physical characteristics of the gas, such as temperature, density, moisture content and absolute pressure. For example, according to my previous application, the controlling mechanism includes three cups in a receptacle and corresponding floats cooperating with separate supplies of liquid of which the upper surfaces are exposed to gas at upstream pressure in said receptacle, and a separate receptacle interconnecting with one of said cups and having a supply of liquid subjected to downstream pressure of the gas. One of said floats moves in response to changes in level of its supporting liquid resulting from variations in differential pressure across the orifice, another responds to changes in temperature, absolute pressure, and moisture content, while the third responds to changes in specific gravity of the gas. My improved apparatus employs a single container for liquid having three interconnecting compartments of special construction and utilizes the effect of balanced columns of liquid therein upon a single float in one of said compartments to prevent the valve orifice area from changing in response to variations in temperature, absolute pressure, moisture content, or density of the gas flowing. It also includes means for multiplying the effect of that portion of the controlling mechanism which introduces the correction for changes in density of the gas, thus measurably increasing the practicability of the meter. Furthermore, my improved construction includes instrumentalities whereby the integrator mechanism is operated by actuating devices which are coordinated with the means for introducing corrections for changes in density of the gas, whereas in the apparatus of my previous application, the integrator is actuated by clock mechanism and its accuracy therefore depends on maintaining uniform speed of the actuating mechanism.

The well established law governing the flow of gas through a main with orifices of varying diameters is exemplified by the following equation for a sharp-edged orifice:

$$\frac{dQ}{dT} = AK\sqrt{2GH} \quad (1)$$

In which:

Q is the volume of gas under conditions that exist in the main.

T is time so that derivative of Q with respect to T, or, $\frac{dQ}{dT}$ is the instantaneous rate of flow.

A is the area of the orifice.
K is the coefficient of discharge.
G is the acceleration of gravity.
H is the differential pressure measured in head feet of gas.

If $Q_s$ is the volume of the gas at standard conditions of temperature, pressure and saturation, then $$\frac{dQ}{dQ_s} = C \quad (2)$$

C being the volumetric ratio of the gas from between a quantity of gas flowing and the same quantity under standard conditions.

It is convenient to measure the differential pressure across the orifice by a column of liquid and in order to transform this value into the height of a column of gas we have the following relation:

$$HD_g = PD_L \quad (3)$$

In which:

$D_g$ = the density of the gas.
$D_L$ is the density of the liquid used for making the measurement.
P is the height of the column of liquid.

From this relation:

$$H = PD_L/D_g \quad (4)$$

Substituting the value of $dQ$ from (2) and H from (4) we have $$\frac{CdQ_s}{dT} = (AK)\sqrt{2GPD_L/D_g} \quad (5)$$

In a centrifugal device which will be described later, a relatively small portion of the gas to be measured is rotated rapidly to develop a differential pressure between the gas at its axis and the gas at the periphery of the rotating member. This differential pressure designated as M, may be measured by a U tube manometer. In such a centrifugal device $$M = K_1 V^2 D_g = K_1 D_g \left(\frac{dL}{dT}\right)^2 \quad (6)$$

In which:

$K_1$ is a constant depending on the dimensions of the rotating member.

V is the peripheral velocity $= \frac{dL}{dT}$

L being the linear movement of the periphery of the rotating member.

$$D_g = \frac{M}{K_1\left(\frac{dL}{dT}\right)^2} \quad (7)$$

Substituting $D_g$ from (7) in (5)

$$\frac{dQ_s}{dT} = AK\frac{dL}{dT}\sqrt{2GD_LK_1\frac{P}{C^2M}} \quad (8)$$

Since $D_L$, $K_1$ and G are constants they may be combined into the constant $K_2$.

$$dQ_s = K_2\sqrt{\frac{P}{C^2M}}(AK)dL \quad (9)$$

$$Q_s = K_2\sqrt{\frac{P}{C^2M}}\int (AK)dL \quad (10)$$

In the apparatus of my invention all changes affecting the value of the ratio, $$\frac{P}{C^2M},$$

will operate mechanism designed to restore said ratio to its original value. Accordingly, in the operation of my apparatus, AK will then be a direct measure of the quantity of gas flowing, reduced to standard conditions. In other words, with my apparatus, this follows because the area of the orifice is made to vary directly with the gas demand; and with changes in gas demand the orifice area changes and thereby restores the differential pressure across the orifice to the value it had before such change took place. Thus, the numerator, P, of the ratio $$\frac{P}{C^2M}$$

is maintained constant for varying demands for gas. The denominator of this ratio includes the factors of density and the quantity C, which as above pointed out, represents a relation of the factors of density, temperature, absolute pressure and moisture content. If the density of a gas flowing through my meter should change, the differential pressure due thereto also changes so that the ratio $$\frac{P}{C^2M}$$

remains the same. The same is true of the factors of temperature, absolute pressure, and moisture content represented in the factor C. The area of the orifice, therefore, changes only in response to a change in demand. Changes in the factor C and M also simultaneously involve corresponding changes in the value of the numerator, P, so that the ratio is maintained constant with changes in density, absolute pressure, temperature, and moisture content.

One form of apparatus embodying my invention is illustrated on the accompanying drawings which form a part of this application, and in which Figure 1 is a diagrammatic view partly in plan and partly in elevation of metering apparatus embodying my invention; and Figure 2 a detailed view of an adjustable orifice valve.

Referring to the drawings, a gas main 1 is equipped with a valve housing 2 in which an adjustable orifice valve 3 is positioned in the path of the gas stream. Valve 3 is preferably of the iris diaphragm type actuated by any suitable prime mover such as a motor 4 through a shaft 5, said motor being controlled by a switch having terminals 6 and 7 and a movable contact 8 mounted on one arm of a bell crank lever pivotally supported in the wall of a compartment 9 of a container and having its other arm 10 connected to a float 11 in said compartment. The compartment 9 communicates with compartments 12 and 13 of said container which is provided with a supply of suitable liquid such as oil for supporting and moving the float 11. A conduit 14 connects compartment 9 with the upstream side of valve 3 and a conduit 15 connects compartment 12 with the downstream side of valve 3. Accordingly, with the parts in proper adjustment based upon a predetermined differential, it is apparent that the position of float 11 at any given time will depend upon changes in differential pressure across the orifice of valve 3 and that a variation in the liquid level in compartment 9 due to such a change will cause movement of the contact 8 to close the motor circuit, thereby adjusting the opening of valve 3 to re-establish the predetermined differential.

As previously indicated, the volume of gas passing the orifice is a function of the product AK, K being the co-efficient of discharge of the orifice which is in turn a function of the area thereof and of the area of the gas main. The latter area being constant, K therefore varies only as a function of A which is the area of the orifice. Accordingly, I have provided recording and integrating mechanism adapted to cooperate with the orifice actuating mechanism in such a manner as to record and indicate the quantity of gas passing at all positions of adjustment of the valve orifice. As illustrated in Figure 1 of the drawings, such mechanism includes a cam plate 16 having a curved cam surface 17, the contour of which is determined by the law governing the flow of standard gas, as above stated. The cam 16 is pivotally mounted at 18 in position to operatively engage recording mechanism including an indicating unit 19 of any suitable construction and means for actuating the same, shown in the drawing as comprising a rack 45 engaging a pinion 20 which actuates the recording device 19 through another pinion 60 moved by a gear 61 carrying pawls 62 cooperating with a ratchet 63 connected to pinion 20. The rack 45 is slidably mounted for periodic endwise movement by a definite amount in one direction, as upwardly, the extent of the return movement being defined and limited by the position of a slidably movable detent 21 engaging the cam 16. The rack 45 is mounted on a rod 22 provided with a collar 23. A motor 24 through suitable gearing drives a gear 25 to which is attached a pitman 26 slidably engaging the rod 22. In operation, as gear 25 rotates, the end of pitman 26 periodically engages the collar 23, thus lifting rack 45 to its most extended position. Upon return of pitman 26 to its lowermost position, the rod 22 is permitted to return by gravity and is stopped by engaging the detent 21, the position of said detent having been determined by reference to its point of engagement with the cam 16. The position of rotation of cam 16 is in turn determined by suitable connection with the valve actuating means and includes a selsyn motor 27 positioned to be actuated by rotary movement of shaft 5 through gears 28 and 29. Motor 27 is electrically connected with a similar selsyn motor 30 and imparts to a shaft 31 thereof a motion of rotation equal in extent to the motion of rotation of shaft 5, thereby rotating cam 16 a corresponding amount. If desired, the record disclosed on the recording and indicating unit 19 may be duplicated on a distant indicating unit as 32 by means of a selsyn motor 33 connected by suitable gearing to the pinion 20 and cooperating through a suitable electric connection with a similar selsyn motor 34 positioned to actuate the indicating unit 32.

The mechanism thus far described has to do only with the measuring of gas flow without allowance for variations in density, temperature, absolute pressure and moisture content. Omitting mechanical devices designed to compensate for variations in these factors, the operation of my improved apparatus is as follows:

Suppose the orifice opening to be at a definite size sufficient to pass the current demand for gas. The differential across the orifice is at the proper predetermined value or such that no connection is formed between contact 8 and either of the terminals 6 or 7 and the motor 4 is therefore inoperative, thus maintaining the orifice opening at said predetermined size. The cam 16 also occupies a definite position corresponding to the extent of opening of the orifice. The motor 24 operates continuously and therefore the pitman 26 moves up and down, periodically raising the rack 45 which, on its downward movement actuates the recording and indicating unit 19. Under these conditions, the rack 45 travels only a portion of the distance covered by the end of the pitman and a definite amount is recorded on the unit 19 upon each downward stroke of the rack. Assuming that the demand for gas increases, the pressure on the downstream side of the orifice is diminished but the upstream pressure remains constant, thus increasing the differential. The result is to lower the level of liquid in compartment 9 while raising the level of liquid in compartment 12. The float 11 descends with the lowered level of the liquid in compartment 9 thus deflecting the contact 8 into engagement with terminal 6 which causes motor 4 to operate in a direction to increase the size of the orifice opening. As the opening increases, the differential tends to return to its predetermined value, thus releasing contact 8 from engagement with terminal 6 and preventing any further enlargement of the orifice opening. Meanwhile, the rotation of shaft 5 in the operation of extending the orifice opening is identically reproduced by means of the selsyn motors 27 and 30 in shaft 31 which rotates in such a direction that the cam is turned to present a shorter distance between its center and the point of peripheral contact with detent 21, thereby extending the length of the return motion of rack 45 and increasing the amount of movement per stroke recorded by the indicating unit 19.

However, as previously stated, a meter constructed according to the present invention is intended to automatically correct and allow for variations in density, temperature, absolute pressure and moisture content. Thus, it is possible to present on indicator 19 a reading of gas volume referred to any desired standard conditions. The additional apparatus provided more particularly for introducing the correction for variation in density includes the compartment 13 connected by means of a conduit 32' to a housing 33' which in turn communicates with the main 1 on the upstream side of orifice 3 by means of a conduit 34'. A hollow centrifugal blower 35 is journaled to rotate within the housing 33' and is provided with a hub 36 having a central passageway 37 communicating with conduit 34', thus permitting entrance of gas from the main to the interior of the blower and centrally thereof. Peripherally disposed openings 38 in the blower allow the gas to escape therefrom. The motor 24 operates continuously to drive blower 35, thus creating a pressure differential between the gas in the main and gas as it issues through the peripheral openings 38. This induces a condition of pressure greater than the pressure of gas in the main within the compartment 13 and the level of the liquid therein is therefore sensitive to variations in said pressure. A conduit 39 may be interposed between the conduit 32' and the main 1 on the down stream side for the purpose of permitting a gradual circulation of gas through the blower, thus making it certain that the gas in the blower at any given time is representative of the gas flowing in the main. This circulation in conduit 39 is preferably limited by a constricted opening, as at 40.

The differential pressure developed by a centrifugal device of the type just described is directly proportional to the density of the fluid therein contained and the square of the peripheral velocity. Assuming then that the density of the gas increases, the effect is to increase the differential across orifice 3, in which event the level of fluid in compartment 9 is lowered together with float 11. Unless arrested, this action would cause the contact 8 to swing into engagement with terminal 6 thus setting the motor 4 into operation to enlarge the size of the orifice opening. However, as the density of the gas increases, the differential developed in the centrifugal device just described also increases and increases the pressure in compartment 13 thus displacing the liquid therein sufficiently to overcome the threatened lowering of the level thereof in compartment 9 caused by the increase in differential across the orifice. This balancing of forces prevents effective deflection of the contact 8 so that no change in the orifice area results from a change in the density of the gas flowing.

Apparatus embodying my invention also includes means for introducing corrections necessitated by variations in temperature, absolute pressure, and moisture content of the gas. As shown in Figure 1, a container 41 is secured in intimate contact with an exterior portion of main 1 so that the same temperature conditions may simultaneously exist in both. To aid in this result, an outer covering 42 of asbestos or other suitable insulating material is applied to the exposed walls of container 41. A conduit 43 connects the interior of compartment 9 with the interior of container 41 in which a predetermined quantity of gas is entrapped by and in contact with a supply of water floating on top of the oil which occupies the lower portions of the closed receptacles and the conduit 43 and therefore remains constantly saturated with moisture. It will be understood that under normal conditions with the gas saturated at 60 degrees Fahrenheit and 30 inches of pressure, the upper surface 50 of the water in chamber 41 will preferably be on the same level with the upper surface 51 of the water in compartment 9, its preferred position being indicated in dotted lines in Figure 1.

With an increase in the temperature of the gas in the main the differential pressure across the orifice increases. This, if not compensated for, would force oil from the cup or compartment 9 and depress float 11, thus changing the size of the valve opening without a corresponding change in gas demand. For this reason enough oil must be forced back into cup 9 to exactly replace the oil forced out by the change in differential across the orifice. As the temperature of the gas in the main rises the temperature of the gas enclosed in the chamber or container 41 also rises, due to the good heat conductivity of that portion of the wall of the main contiguous with container 41. This rise in temperature of the gas in 41 causes it to expand, thus displacing enough oil into cup 9 to maintain the float 11 at the same or predetermined level, thereby preventing a change in the size of the orifice. For a lowering in gas temperature the same operation occurs in a reversed order.

Absolute pressure is made up of atmospheric pressure and the pressure within the main itself. For an increase in absolute pressure the differential pressure across the orifice is decreased. This decrease in differential pressure would tend, if unrestrained, to raise the oil level in cup 9. As the absolute pressure in the gas main increases the gas in the container 41 is compressed by reason of the higher pressure on the oil in cup 9 and thence through the oil and water column into the container 41. This compressive action forces enough oil out of cup 9 to exactly balance that forced into the cup 9 from the cup or compartment 12 by the action of the lowered differential across the orifice. In other words, oil is forced out of cup 12 into cup 9 by the lowered differential across the orifice. The addition of this quantity of oil is exactly neutralized in effect by the displacement of a quantity of oil forced from cup 9 toward the chamber 41 by the increased pressure above the oil in cup 9. Thus the position of the float 11 remains the same and size of the orifice is not altered by a change in absolute pressure.

For standard conditions the gas should be saturated with moisture at a temperature of 60° Fahrenheit and at a pressure of 30" of mercury. However, due to varying conditions in gas manufacture or in the distributing mains this condition is seldom encountered. Without proper corrective means an accurate determination of gas volume in standard cubic feet could not be obtained. The moisture content of a gas in contact with water varies in accordance with conditions of temperature and pressure of the gas. Since the gas in chamber 41 is entrapped above a surface of water it will always be free to absorb or reject as much moisture as is determined by conditions of temperature and pressure occurring within the chamber. Furthermore since these conditions are the same as those in the main, it will be apparent that the gas in chamber 41 will always be completely saturated for all temperatures and pressures of the gas in the main. With an increase in moisture content of the gas approaching the variable orifice the differential pressure across this orifice is increased and would tend, through the float 11, to actuate the valve operating motor to enlarge the orifice opening unless a proper compensating action occurred. But the moisture content of the entrapped gas in the chamber 41 also increases in order to maintain the state of saturation under the new conditions and therefore causes an expansion of the gas in the chamber 41, thus forcing sufficient oil into cup 9 to exactly replace that forced from cup 9 into cup 12 by the increased differential pressure across the orifice. In this way the effective position of float 11 is not disturbed and consequently the size of the orifice is not changed for a variation in moisture content of the gas.

It will be understood that the compartments or cups 12 and 13 are, as to their effective portions, logarithmically shaped. In other words, above a given transverse plane in each cup, indicated by datum lines A—B and C—D, a predetermined volume is provided for and the interior surface contours are such that the volume of liquid contained as in cup 13 is directly proportional to the logarithm of the height of the liquid above said transverse plane or datum line.

From the foregoing description of apparatus embodying my invention and the statement of its mode of operation, it will be apparent that said apparatus provides a meter capable of continuous accurate service and unique in that it automatically introduces into the displayed and recorded reading all corrections for variations in density, temperature, absolute pressure and moisture content of the gas measured. A further feature tending toward accuracy resides in the construction whereby the motor 24 continuously drives both the blower 35 and the integrating mechanism, the latter through shaft 46 and suitable gears actuating worm 47 which in turn meshes with gear 25. Thus, any variation in the speed of motor 24 which would affect the blower and therefore the movement of float 11 is compensated for by a countervailing variation in the speed of the integrating mechanism.

I claim as my invention:

1. In a flow meter, the combination of a main for fluid, a valve therein having a variable orifice, valve actuating means, means responsive to variation in differential pressure across said orifice for effecting operation of said valve actuating means, means communicating with the main and with said operation effecting means for continuously transmitting to the latter a fluid pressure different from that in the main and variable in response to variations in density of the fluid in the main and means responsive to variations in said continuously transmitted pressure for neutralizing the effect upon said operation effecting means of variations in differential pressure across the orifice due to variations in density of the fluid.

2. In a flow meter, the combination of a main for fluid, a valve therein having a variable orifice, valve actuating means, means responsive to variation in differential pressure across said orifice for effecting operation of said actuating means, means communicating with the main and with said operation effecting means for continuously transmitting to the latter a fluid pressure greater than that in the main and variable in response to variations in density of the fluid in the main, and means responsive to variations in said continuously transmitted pressure for neutralizing the effect upon said operation effecting means of variations in differential pressure across the orifice due to variations in density of the fluid.

3. In a flow meter, the combination of a main for gas, a valve therein having a variable orifice, valve actuating means, means responsive to variation in differential pressure across said orifice for effecting operation of said valve actuating means, means communicating with the main and with said operation effecting means for continuously transmitting to the latter a gas pressure different from that in the main and variable in response to variations in density of the gas in the main, and recording mechanism having one portion operatively connected with said valve actuating means and another portion operatively connected with said pressure transmitting means.

4. In a flow meter, the combination of a main for gas, a valve therein having a variable orifice, valve actuating means, means responsive to variation in differential pressure across said orifice for effecting operation of said valve actuating means, means communicating with the main and with said operation effecting means for continuously transmitting to the latter a gas pressure greater than that in the main and variable in response to variations in density of the gas in the main and including a centrifugal blower and actuating means therefor, and means responsive to variations in the pressure produced by said blower for neutralizing the effect upon said operation effecting means of variations in differential pressure across the orifice due to variations in density of the gas.

5. In a flow meter, the combination of a main for gas, a valve therein having a variable orifice, valve actuating means, means responsive to variation in differential pressure across said orifice for effecting operation of said valve actuating means, means communicating with the main and with said operation effecting means for continuously transmitting to the latter a gas pressure different from that in the main and variable in response to variations in density of the gas in the main, recording mechanism comprising a calibrated movable part, means for limiting the extent of movement of said part and means for effecting periodic movement of said parts, means cooperating with the valve actuating means for actuating the extent of movement limiting means, and means cooperating with the pressure transmitting means for actuating the means for effecting periodic movement of the calibrated part.

6. In a flow meter, the combination of a main for gas, a valve therein having a variable orifice, a valve actuating motor, a reversing switch therefor, a receptacle for a float supporting liquid communicating with the main at one side of said orifice, a float in said receptacle, a second receptacle communicating with the main at the other side of the orifice and operatively connected with the first mentioned receptacle and sealed therefrom by said float supporting liquid, a third receptacle operatively connected with said first mentioned receptacle and sealed therefrom by said liquid, a conduit between said third receptacle and the main, means in said conduit for transmitting pressure to the interior of said third receptacle in excess of the pressure in the main, and means cooperating with the float to operate said reversing switch.

7. In a meter, the combination of a main, a valve therein having a variable orifice, valve actuating means including a prime mover, and means for controlling operation of said prime mover including a closed container having a plurality of intercommunicating compartments, a supply of liquid therein, a float in one of said compartments, a conduit connecting the interior of one of said compartments with the main at the upstream side of said valve, a conduit connecting the interior of the other of said compartments with the main at the downstream side of said valve, and means for operatively connecting said float with said prime mover.

8. In a meter, the combination of a main, a valve therein having a variable orifice, valve actuating means including a prime mover, and means for controlling operation of said prime mover including a closed receptacle having a plurality of intercommunicating compartments, a supply of liquid therein, a float in one of said compartments, a conduit connecting the interior of one of said compartments with the main at the upstream side of said valve, a conduit connecting the interior of the other of said compartments with the main at the downstream side of said valve, a second closed receptacle positioned in heat conducting relation to a wall of the main, a predetermined quantity of gas confined in said receptacle, a conduit connecting the interior of said receptacle with the interior of said first mentioned receptacle, and means for operatively connecting the float with said prime mover.

9. In a meter, the combination of a main, a valve therein having a variable orifice, a motor for actuating said valve, means for controlling said motor including a switch, means for effectively connecting the motor and the switch, switch actuating means consisting of a closed container having a plurality of intercommunicating compartments, a supply of liquid in said compartments, a float in one of said compartments, a conduit connecting the interior of one of said compartments with the main at the upstream side of said valve, a conduit connecting the interior of the other of said compartments with the main at the downstream side of said valve, and a switch actuating lever extending through a wall of said container and having one end operatively engaging said float.

10. In a meter, the combination of a main, a valve therein having a variable orifice, valve actuating means including a prime mover, and means for controlling operation of said prime mover including a closed container having a plurality of intercommunicating compartments, a supply of liquid therein, a float in one of said compartments, a conduit connecting the interior of one of said compartments with the main at the upstream side of said valve, a conduit connecting the interior of another of said compartments with the main at the downstream side of said valve, a conduit connecting the interior of a third compartment with the main at the upstream side of the valve, a centrifugal blower effectively interposed in said conduit and adapted to transmit continuously to said third compartment a gas pressure greater than that in the main, and means for operatively connecting said float with said prime mover.

11. In a meter, the combination of a main, a valve therein having a variable orifice, valve actuating means including a prime mover, and means for controlling operation of said prime mover including a closed container having a plurality of intercommunicating compartments, a supply of liquid therein, a float in one of said compartments, a conduit connecting the interior of one of said compartments with the main at the upstream side of said valve, a conduit connecting the interior of another of said compartments with the main at the downstream side of said valve, a conduit connecting the interior of a third compartment with the main at the upstream side of the valve, a centrifugal blower effectively interposed in said conduit and adapted to transmit continuously to said third compartment a gas pressure greater than that in the main, means for operatively connecting said float with said prime mover, blower actuating means, and an integrator operatively connected to said valve actuating means and to said blower actuating means.

12. In a meter, the combination of a main, a valve therein having a variable orifice, valve actuating means, an integrator, means for periodically actuating said integrator, a cam interposed in the path of a portion of said actuating means to limit the extent of movement thereof, and means operating independently of said integrator actuating means and cooperating with said valve actuating means to vary the effective position of said cam.

In testimony whereof, I have signed my name to this specification this 25th day of February, 1926.

G. B. LINDERMAN, Jr.